US006691019B2

(12) United States Patent
Seeley et al.

(10) Patent No.: US 6,691,019 B2
(45) Date of Patent: Feb. 10, 2004

(54) METHOD AND SYSTEM FOR CONTROLLING DISTORTION OF TURBINE CASE DUE TO THERMAL VARIATIONS

(75) Inventors: Charles Erklin Seeley, Niskayuna, NY (US); Ramanath Iyer Ramakrishnan, Niskayuna, NY (US); James Patrick Claeys, Anderson, SC (US); Martel Alexander McCallum, Simpsonville, SC (US); Anthony Constantine Thermos, Greer, SC (US); Hsin-Pang Wang, Rexford, NY (US); Weiping Wang, Palo Alto, CA (US)

(73) Assignee: General Electric Company, Niskayuna, NY (US)

( * ) Notice: Subject to any disclaimer, the term of this patent is extended or adjusted under 35 U.S.C. 154(b) by 206 days.

(21) Appl. No.: 09/683,403

(22) Filed: Dec. 21, 2001

(65) Prior Publication Data

US 2003/0120415 A1 Jun. 26, 2003

(51) Int. Cl.[7] .................. G06F 19/00
(52) U.S. Cl. .................. 701/100; 415/108; 415/200
(58) Field of Search .................. 701/100; 60/266; 415/108, 200, 182.1

(56) References Cited

U.S. PATENT DOCUMENTS

| | | | | |
|---|---|---|---|---|
| 4,268,221 A | | 5/1981 | Monsarrat et al. | 415/116 |
| 4,398,866 A | | 8/1983 | Hartel et al. | 415/180 |
| 4,571,935 A | * | 2/1986 | Rice | 60/775 |
| 4,716,721 A | | 1/1988 | Pask et al. | 60/796 |
| 4,738,902 A | * | 4/1988 | Prewo et al. | 428/697 |
| 4,896,499 A | * | 1/1990 | Rice | 60/792 |
| 5,166,626 A | | 11/1992 | Hester et al. | 324/690 |
| 5,605,438 A | | 2/1997 | Burdgick et al. | 445/182.1 |
| 6,345,953 B1 | * | 2/2002 | Henkel et al. | 415/108 |
| 2002/0041821 A1 | * | 4/2002 | Manning et al. | 420/446 |
| 2002/0121082 A1 | * | 9/2002 | Hashimoto | 60/266 |
| 2003/0110778 A1 | * | 6/2003 | Karafillis et al. | 60/785 |

* cited by examiner

*Primary Examiner*—Thomas G. Black
*Assistant Examiner*—Ronnie Mancho
(74) *Attorney, Agent, or Firm*—Penny A. Clarke; Patrick K. Patnode

(57) ABSTRACT

A method for controlling distortion of a turbine case ("case") includes measuring a temperature distribution for the case that includes thermal gradients. The method further includes modeling thermal stresses on the case induced by the thermal gradients, calculating an out of roundness index ("index") resulting from the thermal stresses, and comparing the index with at least one distortion limit to determine whether the case has a satisfactory or an unsatisfactory index. The temperature distribution is controlled for an unsatisfactory index to produce the satisfactory index. A system for controlling distortion of the turbine case includes a thermal measurement system, for measuring the temperature distribution, and a computer configured for modeling the thermal stresses, calculating and comparing the index with the distortion limit, and controlling the temperature distribution for an unsatisfactory index to produce the satisfactory index.

36 Claims, 7 Drawing Sheets

*Fig. 2*
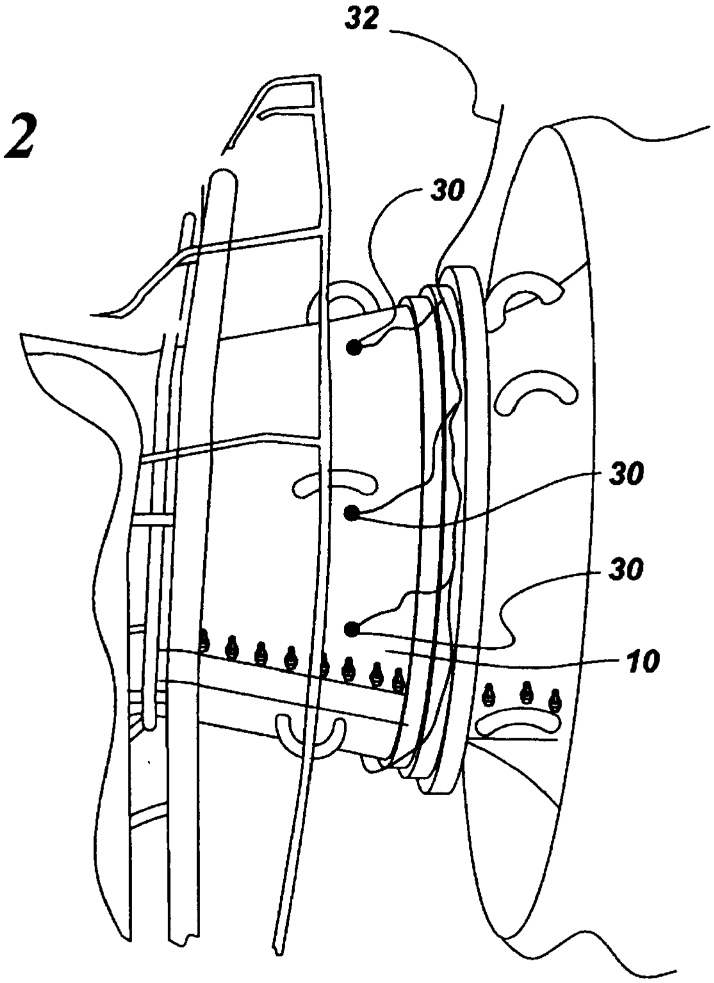
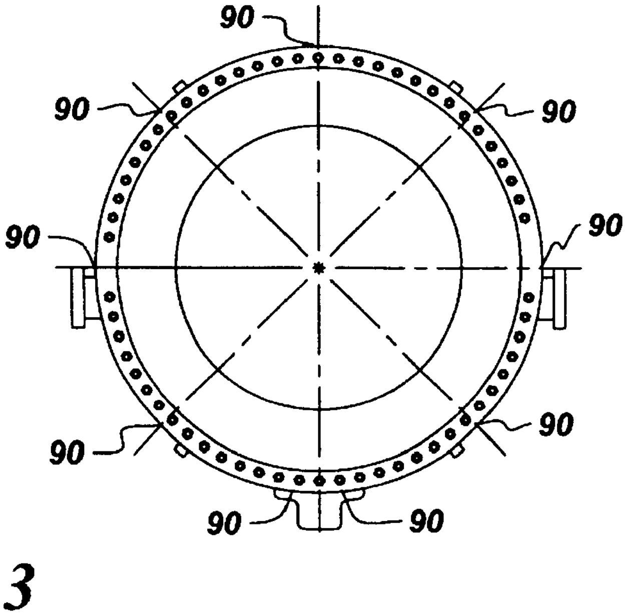
*Fig. 3*

METHOD AND SYSTEM FOR CONTROLLING DISTORTION OF TURBINE CASE DUE TO THERMAL VARIATIONS

BACKGROUND OF INVENTION

The invention relates generally to a method for reducing distortion of a turbine case due to thermal variations and, more particularly, for reducing distortion of a gas turbine case due to thermal variations.

Gas turbines include a rotor and rotating disks that are attached to the rotor. Airfoils (or blades) are positioned at the outer diameter of the disks. These components are surrounded by a case. A gap is present between the tips of the rotor airfoils and the case. If the gap is too small, the airfoils rub against the case causing extensive damage. However, if the gap is too large, turbine efficiency is degraded at a cost of millions of dollars, for an excess of a few millimeters, over the lifetime of the turbine.

Achievement of gas turbine efficiency is further complicated by the fact that tip clearances vary during operation of the turbine. Gas turbine operating conditions vary substantially, based on a combination of intentional and unexpected effects. For example, the operational thermal environment of a gas turbine is complex, including effects from surrounding hot and cold pipes and the combustion chambers. In addition, variations in the thermal environment surrounding the case create temperature gradients within the case. The temperature gradients cause thermal stresses that distort the case.

Although designed to have a circular cross section, distortion of the case due to thermal stresses during operation of the turbine produces a noncircular case cross section. The deviation from a circular cross section reduces the tip clearances, causing the airfoils to rub against the case. To avoid this undesirable outcome, the turbine must be designed with an increased nominal tip clearance in order to compensate for the anticipated mechanical distortion of the case. In particular, the nominal tip clearances must be selected to compensate for the largest possible case distortion due to the large variation in thermal operating conditions for the gas turbine. However, as noted above, large tip clearances decrease the efficiency of the turbine at a cost of millions of dollars, for an excess of a few millimeters, over the lifetime of the turbine.

One previous technique to reduce the tip clearances involved trial-and-error attempts to alter the design of the turbine, followed by conducting computer simulations or tests to determine whether the resulting case distortion and tip clearances satisfy the desired operating criteria. However, given the complex thermal environment of the turbine, design changes can be laborious and time consuming, requiring many iterations. Moreover, a design change may be beneficial under certain operating conditions, while degrading performance under others. For example, changing the design of certain hot pipes near the case may provide a more uniform temperature distribution in the steady state, but adversely affect the temperature distribution during transient conditions, such as during start-up, emergency trip, restart, or shut-down operations. Thus, in addition to being laborious and time consuming, this previous redesign technique can be ineffective.

Accordingly, it would be desirable to develop a method for reducing the distortion of a turbine case due to thermal variations. Such a method would advantageously facilitate the reduction of tip clearances for gas turbines. In addition, it would be desirable for the method to be able to target portions of the turbine case prone to distortion and operation cycles that give rise to distortion. It would further be desirable for the method to avoid the trial and error approach of the prior art methods and to reduce the repeated computer modeling relative to the prior art methods.

SUMMARY OF INVENTION

Briefly, in accordance with one embodiment of the present invention, a method for controlling distortion of a turbine case includes measuring a temperature distribution for the turbine case. The temperature distribution includes a plurality of thermal gradients. The method further includes modeling a number of thermal stresses on the turbine case induced by the thermal gradients, calculating an out of roundness index resulting from the thermal stresses on the turbine case, and comparing the out of roundness index with at least one distortion limit. The method further includes controlling the temperature distribution until the out of roundness index satisfies the distortion limit.

In accordance with another embodiment of the invention, a system for controlling distortion of a turbine case includes a thermal measurement system for measuring the temperature distribution for the turbine case. The system also includes a computer configured for modeling a number of thermal stresses on the turbine case induced by the thermal gradients, calculating an out of roundness index resulting from the thermal stresses, comparing the out of roundness index with at least one distortion limit, and controlling the temperature distribution until the out of roundness index satisfies the distortion limit.

BRIEF DESCRIPTION OF DRAWINGS

These and other features, aspects, and advantages of the present invention will become better understood when the following detailed description is read with reference to the accompanying drawings in which like characters represent like parts throughout the drawings, wherein:

FIG. 2 shows an exemplary arrangement of temperature sensors on a case of the gas turbine engine of FIG. 1;

FIG. 3 schematically illustrates the gas turbine case of FIG. 2 in cross-sectional view, with an exemplary arrangement of temperature sensors distributed on the outer case circumference;

DETAILED DESCRIPTION

Figure 1:
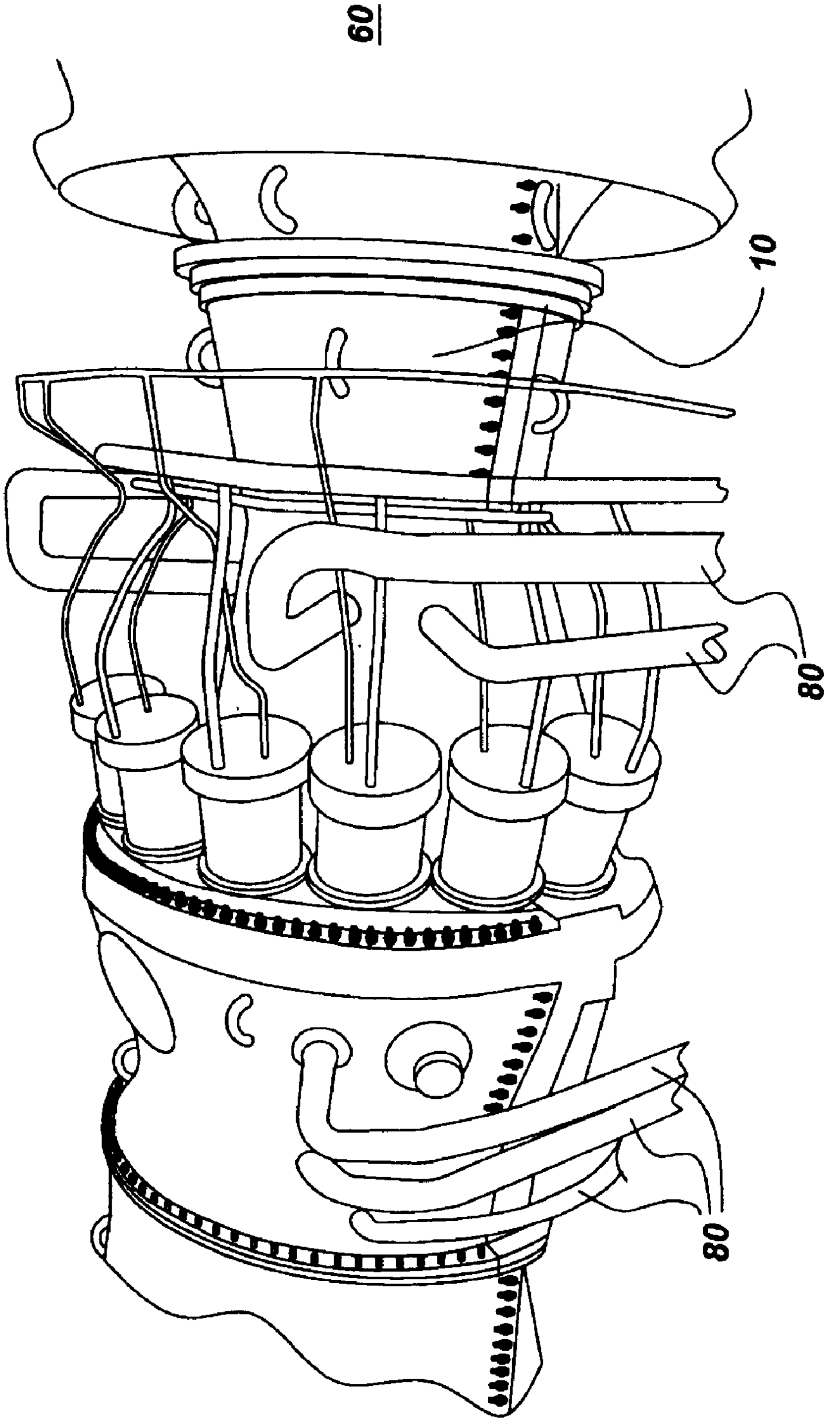
FIG. 1 schematically depicts a gas turbine engine as viewed from an infrared radiometer.

A method embodiment of the invention for controlling distortion of a turbine case 10 (also referred to as "case") due to thermal variations includes measuring a temperature distribution for the case. The temperature distribution comprises a number of thermal gradients. One exemplary turbine case is a gas turbine case 10, as shown in FIGS. 1 and 2. The temperature distribution is measured using standard measurement techniques, such as thermocouple measurements or infrared radiometry, which are discussed in greater detail below.

After the temperature distribution is measured, a number of thermal stresses on case 10 are modeled. The thermal stresses are induced by the thermal gradients and are modeled using standard analytical techniques, such as finite element analysis, boundary element methods, closed form solutions, or solid mechanics.

Next, an out of roundness index O is calculated. The out of roundness index O characterizes the distortion of the case 10 resulting from the thermal stresses induced by the thermal gradients, relative to a case free from distortion.

Figure 5:
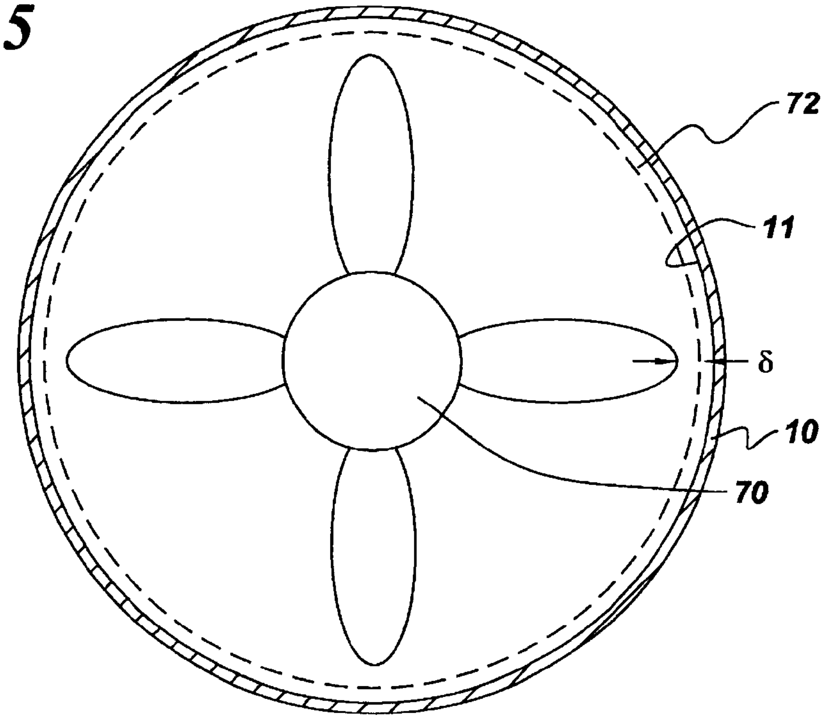
FIG. 5 is a cross-sectional view of the case of FIG. 2 and illustrates a gap 6 between an airfoil and the gas turbine case.
Figure 6:
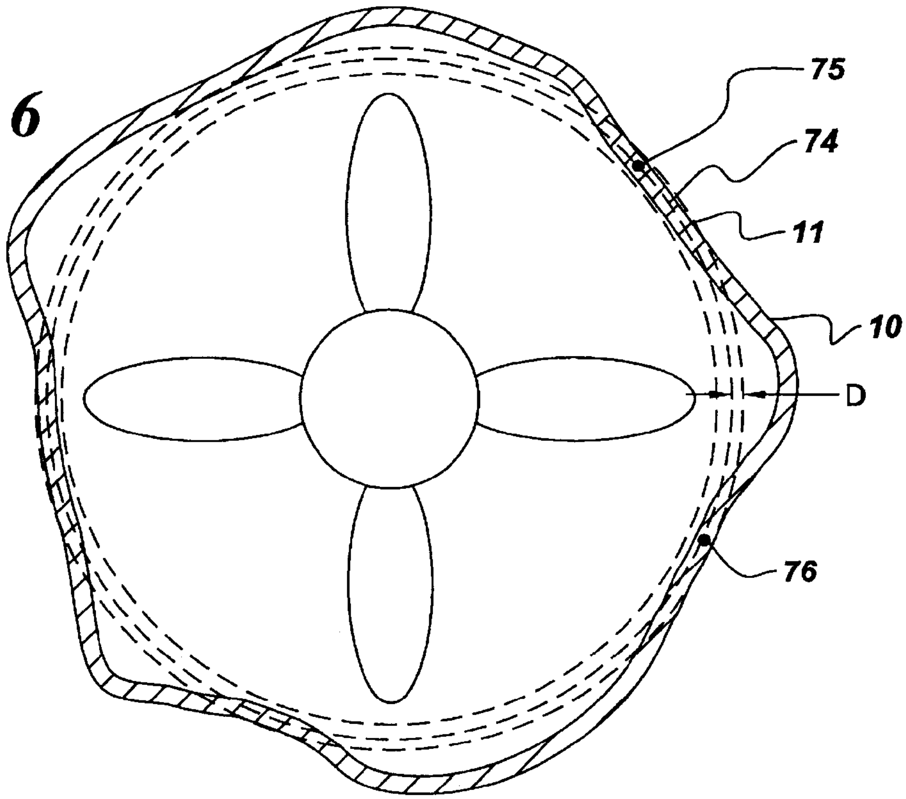
FIG. 6 is a cross-sectional view of the gas turbine case of FIG. 2 after undergoing distortion induced by thermal variations and shows an exemplary distortion limit D.

The method further includes comparing the out of roundness index O with at least one distortion limit D to determine whether or not the case has a satisfactory or an unsatisfactory out of roundness index O. One exemplary distortion limit D is illustrated in FIG. 6 and, as shown, is defined with respect to an interior surface 11 of case 10 absent distortion. Exemplary distortion limits D restrict the average maximum and minimum distances between the case 10 and an airfoil 73 mounted on a rotor disk 70, to ensure that the gap between the airfoil and the case remains within desired ranges despite the subjection of the case to thermal stress. The distortion limit D is thus selected based on engineering criteria to ensure adequate, but not excessive, clearances between the case and the airfoils. As shown for example in FIG. 5, a gap 8 is selected to ensure adequate tip clearances between the airfoils and the case. In order to preserve the gap δ, distortion of the case is controlled such that the case does not penetrate the circle 72 shown in FIG. 5. The exemplary distortion limit D illustrated in FIG. 6 is selected to ensure that this condition is satisfied and typically constrains the average distortion of the case 10, which is characterized by the out of roundness index O, to remain outside a circle 74. As shown for example in FIG. 6, although the distortion of the case exceeds D at certain positions, such as 75, 76, the gap δ is preserved. In this manner, efficient tip clearances are secured for the airfoils 73.

If the out of roundness index O does not satisfy the distortion limit D, the temperature distribution is controlled until the roundness index O satisfies distortion limit D. According to one embodiment, the temperature distribution is controlled as follows. First, a new temperature distribution for case 10 resulting from at least one hypothetical design change is modeled. The new temperature distribution includes a plurality of thermal gradients. For example, the new temperature distribution is modeled using analytical techniques such as finite element, finite difference or conjugate heat transfer methods. Herein the phrase "hypothetical design change" means that the design change is not actually made to the turbine engine 60 or the surrounding equipment at this stage of the method. Rather, a hypothetical design change is simulated, for example using analytical techniques, to model the new temperature distribution of the case. In this way, the effect of the hypothetical design change on the distortion (and hence on the out of roundness index O) of a case of a redesigned turbine can be evaluated. Herein, the term "redesigned turbine engine" encompasses turbine engines with design changes, as well as turbine engines with design changes to the environment of the turbine engine, for example to the ambient environment of turbine engine 60.

Exemplary design changes include changing the placement of hot and cold pipes 80. Exemplary hypothetical design changes to control the local ambient environment of the turbine engine 60 include designing or redesigning a ventilation system through the study of convection patterns in the environment of the turbine engine. Other exemplary design changes include the selective use of insulation, which can be applied to the exterior of portions of the case based on the temperature distribution in the case. These design changes are presented by way of example only and are known to those skilled in the art. It is not the purpose of this invention to enumerate all possible design changes to a turbine engine and its ambient environment. Rather, the invention encompasses the use of any design change made to the turbine engine and to its ambient environment in the course of performing the method of this invention.

Next for this embodiment, a plurality of new thermal stresses on case 10 are modeled. The new thermal stresses are induced by the new thermal gradients. Next, a new out of roundness index O' is calculated. The new out of roundness index O' results from the new thermal stresses on the case and is compared with the distortion limit D to determine whether the case has a satisfactory or an unsatisfactory new out of roundness index O'. The new thermal stresses are modeled using standard analytical techniques, such as finite element analysis, boundary element methods, closed form solutions, or solid mechanics. In the event that the new out of roundness index O' is also unsatisfactory, these modeling and comparison steps are repeated for other hypothetical design changes until a satisfactory new out of roundness index O" is obtained. In this manner, the method controls the distortion of the case to ensure compliance with specified tolerance limits. Advantageously, the temperature distribution and the corresponding distortion of the case are controlled in this manner without resort to a random trial and error approach.

Figure 9:
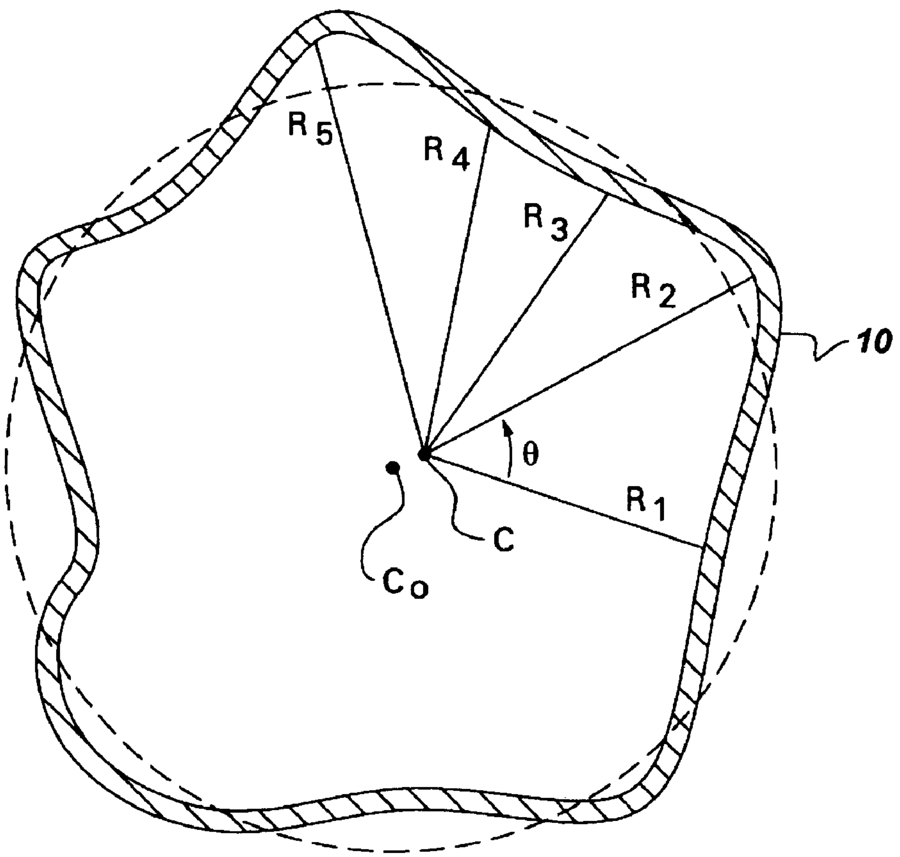
FIG. 9 shows a section of the turbine case of FIG. 7 in cross sectional form, the case being deformed by thermal stresses.

In order to calculate the out of roundness index, according to a specific embodiment of the method, radii $R_\theta$ are determined for case 10 under the thermal stresses. As illustrated in FIG. 9, the radii are determined for a number of angular orientations θ around the case. According to a more specific embodiment, the radii are determined relative to a center C of case 10 under thermal stresses. Center C does not necessarily coincide with the center $C_o$ of the case before it is subjected to the thermal stresses. A mean radius $R_{ave}$ is also determined for the case subject to the thermal stresses. According to one embodiment, mean radius $R_{ave}$ is the radius of case 10 before case 10 is subjected to the thermal stresses. To obtain the out of roundness index O, the difference between the radii $R_\theta$ and mean radius $R_{ave}$ is averaged around case 10. According to one example, the out of roundness index O is calculated using the formula $O=\text{sqrt}(\Sigma_\theta(R_\theta-R_{ave})^2)$. According to other examples, the formulas, $O=[\Sigma_\theta(R_\theta-R_{ave})^2]/R_{ave}$ and $O=\Sigma_\theta|R_\theta-R_{ave}|$ are used. According to other examples, continuous values for the radii $R_\theta$ are used, and the sums are replaced by integrals from 0 to 2 π.

As noted above, standard measurement techniques such as thermocouple measurements and infrared radiometry can be used to measure the temperature distribution for case 10. A measurement technique employed according to one embodiment is illustrated in FIGS. 2 and 3. To record temperature at different locations on the case over a period of time, a number of temperature sensors 30 such as thermocouples (also designated by reference numeral 30) are positioned on the case. By way of example, an exemplary temperature sensor arrangement on a case is depicted in FIG.

2. In this manner, a time series of thermal data is obtained. An exemplary time series of thermal data is obtained under a variety of operating conditions, such as during start-up, steady-state, restart and shut-down operations. According to this embodiment, the thermal data provides the temperature distribution for the part. Exemplary temperature sensor locations include positions where tolerance limits must be met, as well as areas of the case subjected to large thermal distortion. Additional exemplary temperature sensor positions are ambient positions in the case's environment, such as on the hot and cold pipes. The temperature sensors can be connected to a data recorder (not shown), such as a computer (not shown) for recording the time series of thermal data. Moreover, the computer can be used to control the timing of the temperature measurements.

In order to obtain thermal data at ambient positions within the turbine, one or more temperature sensors 30 can be positioned at an ambient position within the turbine, for example on hot and cold pipes 80.

Figure 4:
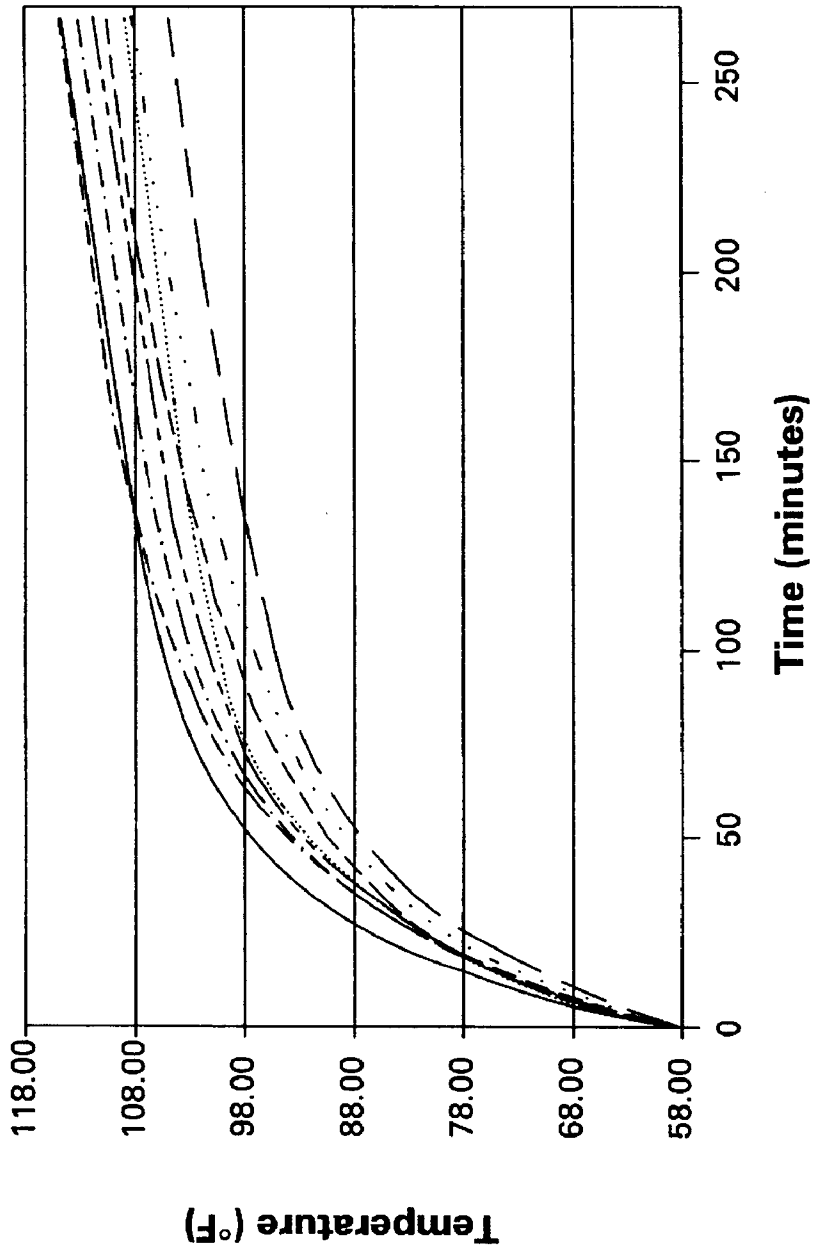
FIG. 4 shows an exemplary set of temperature data for the temperature sensor arrangement of FIG. 3.

In order to obtain thermal data critical to tip clearances, temperature sensors 30 are placed at critical locations on the case 10 according to another embodiment, such as locations 90 near tip clearance measurement probes (not shown). Generally, turbine cases include small holes (not shown) positioned around a row of airfoils 73, for example at the positions 90 shown in FIG. 3, which depicts the case of FIG. 2 in cross-sectional view. Measurement probes, such as feeler gages or micrometers, are inserted through the holes to measure tip clearance (i.e., the distance between the end of the airfoil 73 and the case). Temperature sensors are positioned at the locations 90 on the outer case circumference. Data obtained using the temperature sensor arrangement shown in FIG. 3 is displayed in FIG. 4. This data was obtained for a 155 minute run at 35 second sampling intervals. The maximum variation obtained was about 7.8° C.

According to another embodiment, infrared radiometry is employed to obtain infrared images of case 10. Infrared radiometers (not shown) are standard and well known and hence will not be discussed here. According to this embodiment, case 10 is imaged using the infrared radiometer to obtain one or more thermal images over a period of time. FIG. 1 shows the gas turbine engine 60 as viewed from an exemplary infrared radiometer. Exemplary infrared images are obtained under a variety of operating conditions, such as during start-up, steady-state, restart and shut-down operations. Advantageously, obtaining thermal data for a wide variety of operating conditions facilitates modeling and controlling the thermal distortion of the case for the corresponding varied thermal environment of the case. The infrared image is calibrated, according to one embodiment, using thermal data obtained using the temperature sensors 30. The one or more calibrated thermal images provide the temperature distribution for the case.

Figure 7:
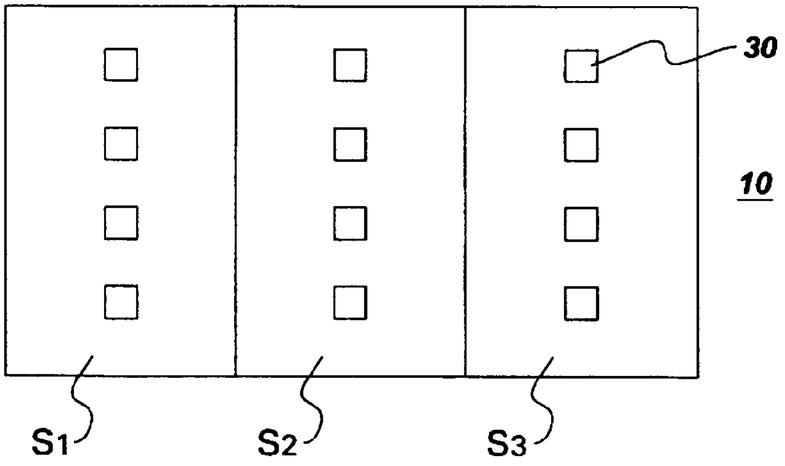
FIG. 7 schematically depicts a sectional representation of a turbine case.

Because of the large amount of thermal data generated, it is useful to represent the case 10 as a set of sections $S_i$. As used herein, the subscript i indicates the section of the case and adopts one or more values, depending on the number of sections $S_i$ selected to represent the case. An exemplary sectional representation of the case is shown in FIG. 7. In order to focus on the distortion of the case near airfoil tips, an exemplary set of sections is selected such that one section is provided for each set of airfoils 73. An exemplary set of airfoils is shown in cross-sectional view in FIG. 5.

Advantageously, the thermal data is grouped by section, providing a thermal data set $\{T_{ijk}\}$ for each section $S_i$. The subscripts j and k refer to the measurement time of the thermal data point and the angular orientation $\theta_k$ of the position at which the thermal data point was obtained, respectively. For example, if case 10 is represented as three sections $S_1$, $S_2$ and $S_3$, and thermal data is collected at two measurement times $t_1$ and $t_2$, the temperature distribution comprises six thermal data sets $\{T_{11k}\}$, $\{T_{12k}\}$, $\{T_{21k}\}$, $\{I_{22k}\}$, $\{T_{31k}\}$, and $\{T_{32k}\}$. Exemplary angular orientations $\theta_k$ are indicated in FIG. 3, at the positions of temperature sensors 30. However, the angular orientations $\theta_k$ need not coincide with the positions of temperature sensors 30. For example, the angular orientations $\theta_k$ can include other designated positions on the section, for which the temperature is determined by infrared imaging or other means. Depending on the number of times (one or more) at which thermal measurements were taken, the subscript j will take on one or more values. Where more than one measurement time j is used, it is desirable to space the measurement times over a time period for which there are observable thermal fluctuations. For example, if measurements are performed for one hour, an exemplary spacing between measurements is one minute. Further, based on the number of angular orientations $\theta_k$ at which thermal data is acquired for each section (for example, the temperature sensor positions indicated in FIG. 3), the subscript k will take on two or more values.

According to this embodiment, the out of roundness index O includes a plurality of sectional out of roundness indices $\{O_{ij}\}$. As explained above, the subscripts i and j represent the section and measurement time, respectively. One sectional out of roundness index $O_{ij}$ is provided for each of the sections $S_i$ and for each of the (one or more) measurement times $t_j$. Accordingly, for the example presented above where the case is represented as three sections $S_1$, $S_2$, and $S_3$ and two measurement times $t_1$ and $t_2$, the out of roundness index O comprises six sectional out of roundness indices $O_{11}$, $O_{12}$, $O_{21}$, $O_{22}$, $O_{31}$, and $O_{32}$. Advantageously, by calculating a sectional out of roundness index $O_{ij}$ for each section $S_i$ and measurement time $t_j$, thermal distortion of the case can be localized both spatially and in time, enabling installation engineers to efficient tailor design changes to problematic sections at specific times in the operation cycle for the turbine.

It should be noted that although the sectional out of roundness indices $O_{ij}$ have been described as being calculated for each measurement time $t_j$ for some applications it will be unnecessary to calculate $O_{ij}$ for each time thermal measurements are performed or even for a numerous subset thereof. Instead, it may be desirable to calculate only one (or a few) sectional out of roundness index (indices) $O_{ij}$ per section $S_i$. Accordingly, as used herein the phrase "measurement time" means the times $t_j$ for which the sectional out of roundness indices $O_{ij}$ are calculated. More precisely, the measurement times according to one embodiment of the method coincide with a subset (of one or more) of the times at which thermal measurements are made. According to another embodiment, the measurement time is a time selected to be at or after the thermal data has been collected.

Figure 8:
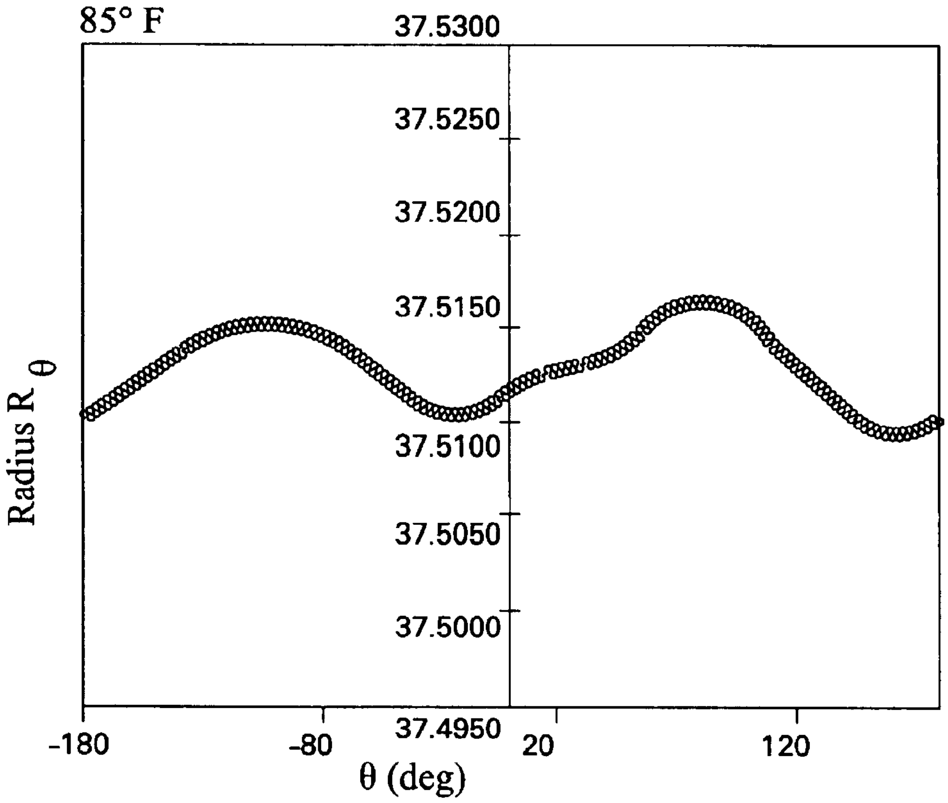
FIG. 8 shows exemplary radii $R_\theta$ for a turbine case subjected to thermal stress.

In order to calculate the sectional out of roundness indices $O_{ij}$, according to a specific embodiment of the method, radii $R_\theta$ are determined for each respective section $S_i$ and measurement time $t_j$, as shown for example in FIG. 9, and as discussed above in the more general embodiment which is not specific to sectional calculations. Radii $R_\theta$ are determined for a number of angular orientations θ around section $S_i$. According to a more specific embodiment, the radii are determined relative to a center C of the section under thermal stresses. A mean radius $R_{ave}$ is also determined for section $S_i$ at measurement time $t_j$. According to one embodiment, mean radius $R_{ave}$ is the radius of the section before case 10 is subjected to the thermal stresses. To obtain the sectional out of roundness index $O_{ij}$, the difference between the radii $R_\theta$ and mean radius $R_{ave}$ is averaged around the section. An exemplary set of radii $R_\theta$ is shown in FIG. 7 and was obtained for a section $S_i$ of the exemplary case 10 of FIG. 2. Finite element analysis was used to model the thermal stresses induced by the temperature distribution for the case, which was obtained from infrared images calibrated with thermocouple data. In order to calculate radii $R_\theta$ and average radius $R_{ave}$, a best fit routine was performed to calculate center C of section $S_i$ under the thermal stresses. Center C was used to determine radii $R_\theta$ shown in FIG. 8. As shown in FIG. 8, radii $R_\theta$ vary with angle $\theta$.

Thermal data sets $\{T_{ijk}\}$ are obtained using temperature sensors 30 and/or the infrared radiometry, as discussed above. According to one example, a set of temperature sensors is positioned on each section $S_i$ of case 10, as exemplarily shown in FIG. 7 and in FIG. 3 in cross-sectional view. According to another example, at least one temperature sensor is positioned on each section for calibrating infrared images of the case. In addition, at least one temperature sensor can be positioned at an ambient position on the turbine.

Using the sectional representation of case 10, the thermal data is advantageously reduced for use in the modeling step. According to one embodiment, a coefficient of thermal variation $c_{ij}$ is calculated for each thermal data set $\{T_{ijk}\}$. As explained above, subscripts i, j, and k represent the section, measurement time, and angular orientation $\theta_k$ of the position at which the thermal data point was obtained, respectively. Advantageously, coefficient of thermal variation $c_{ij}$ represents the thermal variation at section $S_i$ at measurement time $t_j$ as a scalar. Each sectional out of roundness indices $O_{ij}$ is correlated with the coefficient of thermal variation $c_{ij}$ for the respective section $S_i$ and measurement time j to obtain a plurality of correlated sectional out of roundness indices $O_{ij}$ $(c_{ij})$.

By correlating out of roundness indices $O_{ij}$ with the respective coefficients of thermal variation $c_{ij}$, the comparison of out of roundness index $O_{ij}$ with distortion limit D is performed on a section-by-section basis as follows. First, each correlated sectional out of roundness index $O_{ij}$ $(c_{ij})$ is interpolated to obtain a generalized coefficient of thermal variation $c_{ij}$ $(O_{ij})$ for the respective section $S_i$ and measurement time $t_j$, as a function of the respective out of roundness indices $O_{ij}$. Next, according to this embodiment, each generalized coefficient of thermal variation $c_{ij}$ $(O_{ij})$ is evaluated at the distortion limit D to determine a thermal variation limit $c_{ij}$ (D) for the respective section $S_i$ and measurement time $t_j$. Each thermal variation limit $c_{ij}$ (D) quantifies the maximum thermal variation for satisfying distortion limit D for the respective section $S_i$ of the case and measurement time t After thermal variation limits $c_{ij}$ (D) for the respective sections $S_i$ of the case 10 and (one or more) measurement times $t_j$ are determined, the temperature distribution is controlled such that each of the thermal data sets $\{T_{ijk}\}$ satisfies the respective thermal variation limits $c_{ij}$ (D). In this manner, an out of roundness index O is obtained that satisfies distortion limit D in each section $S_i$ of the case at each measurement time $t_j$.

The method can also be generalized to use a number of distortion limits $\{D_i\}$, where one distortion limit $D_i$ is specified for each section $S_i$. According to this embodiment, each generalized coefficient of thermal variation $c_{ij}$ $(O_{ij})$ is evaluated at distortion limit $D_i$ for section $S_i$ to determine the thermal variation limit $c_{ij}$ $(D_i)$ for section $S_i$.

In the event that the thermal variation limits $c_{ij}$(D) (or $c_{ij}$ (D) if separate distortion limits $D_i$ are specified for each of the sections $S_i$) are not satisfied by the respective $O_{ij}$ (i.e., $O_{ij}>c_{ij}(D)$), the temperature distribution is controlled as follows, according to another embodiment of the method. First, a new temperature distribution is modeled for case 10 resulting from at least one hypothetical design change. Exemplary hypothetical design changes are discussed above. Based on engineering judgment, hypothetical design changes are evaluated individually or several hypothetical design changes are evaluated simultaneously. The new temperature distribution includes a number of new thermal data sets $\{T_{ijk}'\}$ Each new thermal data set $\{T_{ijk}'\}$ is modeled for a respective section $S_i$ and measurement time $t_j$.

Because the thermal distortion of case 10 is examined on a section by section basis, the hypothetical design changes can be efficiently selected to target sections exhibiting unsatisfactory levels of thermal distortion. For example, hypothetical design changes can be tested to control the local ambient environment of the gas turbine engine 60 when the results of the comparison of the coefficients of thermal variations $c_{ij}$ with the respective thermal variation limits $c_{ij}$ (D) suggest that such controls are needed. Moreover, because thermal distortion of the case is also examined at different times during the operation cycle for the turbine, problematic stages in this cycle can also be targeted.

Next, a new coefficient of thermal variation $c_{ij}'$ is calculated for each section $S_i$ and measurement time $t_j$ using a respective new thermal data set $\{T_{ijk}'\}$. Each new coefficient of thermal variation $c_{ij}'$ is compared with the respective thermal variation limit $c_{ij}$ (D) to determine whether case 10 has a satisfactory or an unsatisfactory new temperature distribution. In the event that the redesigned turbine engine has an unsatisfactory new temperature distribution, these calculation and comparison steps are repeated using new hypothetical design changes or new combinations of hypothetical design changes until the satisfactory new temperature distribution is obtained. According to a specific embodiment, both the thermal stresses on case 10 and the new temperature distribution are modeled using finite element analysis. By localizing thermal distortion to specific sections of the case for specific times during the operation cycle of the turbine engine, satisfactory design changes can be quickly obtained, without resort to a random and time consuming trial and error process.

Alternatively, the temperature distribution is controlled as follows, according to yet another embodiment of the method. First, the new temperature distribution comprising the new thermal data sets $\{T_{ijk}'\}$ is modeled for case 10. As discussed above, the new temperature distribution results from at least one hypothetical design change. A new set of thermal stresses on the case is modeled based on the new temperature distribution. A number of new sectional out of roundness indices $O_{ij}'$ are calculated resulting from the new thermal stresses on the case. New coefficients of thermal variation $c_{ij}'$ are calculated for each section $S_i$ and measurement time $t_j$ using the respective new thermal data set $\{T_{ijk}'\}$. Each new sectional out of roundness index $O_{ij}$, is correlated with the respective new coefficient of thermal variation $c_{ij}'$ to obtain a set of new correlated sectional out of roundness indices $O_{ij}'(c_{ij}')$. New correlated sectional out of roundness indices $O_{ij}'$ $(c_{ij}')$ are interpolated to obtain a set of new generalized coefficients of thermal variation $c_{ij}'(O_{ij}')$, each of which is then evaluated at distortion limit D to determine a respective thermal variation limit $c_{ij}'(D)$. Each new coefficient of thermal variation $c_{ij}$, is compared with the respective thermal variation limit $c_{ij}$ (D) to determine whether case 10 has a satisfactory or an unsatisfactory new temperature distribution. In the event that the redesigned turbine engine has an unsatisfactory new temperature distribution, these steps are repeated using new hypothetical design changes or new combinations of hypothetical design changes until the satisfactory new temperature distribution is obtained.

After the distortion of case 10 is controlled such that out of roundness index O satisfies distortion limit D, the hypothetical design changes used to achieve the satisfactory distortion for case 10 are implemented in practice, according to another embodiment of the method. After implementation of the design changes, the new actual temperature distribution is measured, according to another embodiment, to confirm that the new actual temperature distribution is satisfactory. For example, new actual coefficients of thermal variation $c_{ij}$ can be compared with the respective thermal variation limits $c_{ij}$ (D) to ensure that the thermal distortion has been controlled to specifications.

To exploit standard statistical algorithms, according to a specific embodiment of the method, coefficients of thermal variation $c_{ij}$ are generated for each section $S_i$ and measurement time $t_j$ as follows. A standard deviation $\sigma_{ij}$ and a mean temperature $\mu_{ij}$ are determined for thermal data set $\{T_{ijk}\}$ for each section $S_i$ and for each of the (one or more) measurement times $t_j$. Coefficient of thermal variation $c_{ij}$ is determined as a function of the corresponding standard deviation $\sigma_{ij}$ and mean temperature $\mu_{ij}$. According to a more specific embodiment, coefficient of thermal variation $c_{ij}$ is evaluated as:$c_{ij}=\sigma_{ij}/\mu_{ij}$.

This thermal variation model is advantageous in that it provides an overall index of the deviation of temperatures in a section from uniformity. Of course, alternative thermal variation modeling schemes can also be employed. For example, a thermal variation $c_{ij}$ may be defined to be proportional to the ratio of the standard deviation $\sigma_{ij}$ to the mean temperature $\mu_{ij}$, for example $c_{ij}=3\sigma_{ij}/\mu_{ij}$.

New coefficients of thermal variation $c_{ij}'$ are calculated in the same manner as are coefficients of thermal variations $c_{ij}$, according to this embodiment of the method. More particularly, a standard deviation $\sigma_{ij}'$ and a mean temperature $\mu_{ij}'$ are determined for new thermal data set $\{T_{ijk}'\}$ for each section $S_i$ and for each of the (one or more) measurement times j. New coefficient of thermal variation $c_{ij}'$ is determined as a function of the corresponding standard deviation $\sigma_{ij}'$ and mean temperature $\mu_{ij}'$. According to a more specific embodiment, new thermal variation $c_{ij}'$ is determined as $c_{ij}'=\sigma_{ij}'/\mu_{ij}'$.

The above described method has many advantages. For example, it efficiently determines hypothetical design changes that achieve the desired degree of thermal distortion control, without resort to laborious trial and error procedures, such as actually making design changes to the turbine engine 60, or repeatedly modeling the thermal distortion of a case of a redesigned turbine engine. Using this method, the thermal distortion of case 10 need only be modeled once to determine thermal variation limits $c_{ij}$ (D). Subsequent modeling steps only involve modeling new thermal distributions for the case induced by the hypothetical design changes. Furthermore, by providing a method to efficiently reduce thermal distortion in turbine case 10 during all stages of the turbine engine's operational cycle, the tip clearances for the turbine engine can be reduced without causing airfoils 73 to rub against case 10. Reducing the tip clearances, in turn, increases the turbine engine's efficiency, providing considerable savings over the lifetime of the gas turbine engine.

In one example embodiment, a method for controlling distortion of a gas turbine case 10 includes the steps of representing gas turbine case 10 as sections $S_i$, measuring the temperature distribution comprising thermal data sets $\{T_{ijk}\}$ for gas turbine case 10, calculating the sectional out of roundness indices $\{O_{ij}\}$ using thermal data sets $\{T_{ijk}\}$, comparing the sectional out of roundness indices $\{O_{ij}\}$ with the distortion limit D, and controlling the temperature distribution until the sectional out of roundness indices satisfy distortion limit D.

In a second example embodiment, the method for controlling distortion of gas turbine case 10 further includes calculating coefficients of thermal variation $c_{ij}$ using thermal data set $\{T_{ijk}\}$ that are then correlated with sectional out of roundness indices $\{O_{ij}\}$ to obtain correlated sectional out of roundness indices $O_{ij}$ ($c_{ij}$). According to this example embodiment, comparison of the sectional out of roundness indices $\{O_{ij}\}$ with the distortion limit D includes interpolating the correlated sectional out of roundness indices $O_{ij}$ ($c_{ij}$) to obtain generalized coefficients of thermal variation $c_{ij}$ ($O_{ij}$), which are then evaluated at the distortion limit D to determine thermal variation limits $c_{ij}$ (D), which in turn are compared with the coefficients of thermal variation $c_{ij}$. In addition, control of the temperature distribution includes altering the temperature distribution to satisfy the thermal variation limits $c_{ij}$ (D).

In a third example embodiment, alteration of the temperature distribution includes modeling a new temperature distribution comprising new thermal data sets $\{T_{ijk}'\}$ for gas turbine case 10 resulting from at least one hypothetical design change, and calculating new coefficients of thermal variation $c_{ij}'$ using new thermal data sets $\{T_{ijk}'\}$ for comparison with the thermal variation limits $c_{ij}$ (D). According to this third example embodiment, the temperature distribution is repeatedly altered until the satisfactory new temperature distribution is obtained.

In a fourth example embodiment, the coefficients of thermal variation $c_{ij}$ are calculated using the formula $c_{ij}=\sigma_{ij}/\mu_{ij}$. Similarly, the new coefficients of thermal variation $c_{ij}'$ are calculated using the formula $c_{ij}'=\sigma_{ij}'/\mu_{ij}'$.

Figure 10:
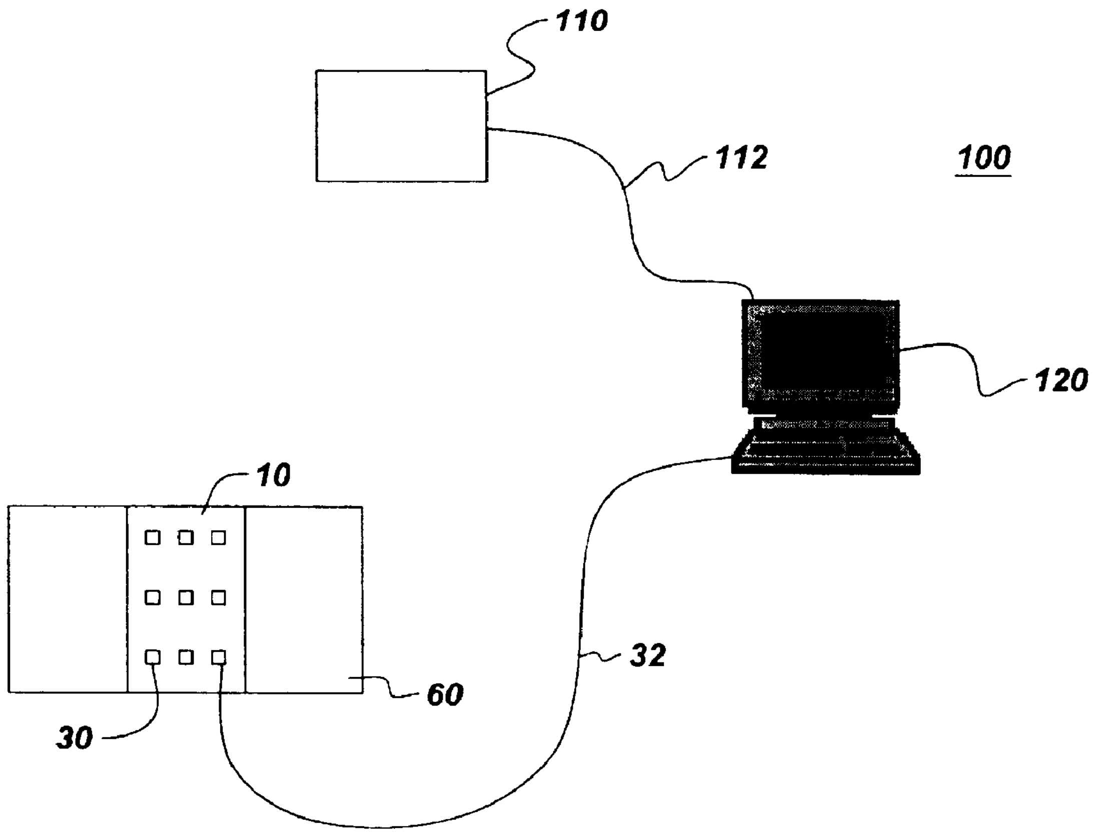
FIG. 10 schematically depicts a system embodiment of the invention.

A system 100 embodiment of the invention is schematically illustrated in FIG. 10. System 100 for controlling distortion of turbine case 10 includes a thermal measurement system (indicated by reference numerals 30 and 110 for the system shown in FIG. 10) for measuring the temperature distribution for turbine case 10. The temperature distribution includes a number of thermal gradients. System 100 further includes a computer 120 configured for modeling the stresses on turbine case 10 induced by the thermal gradients. An exemplary computer 120 is equipped with software for performing finite element analysis for modeling the stresses.

It should be noted that the present invention is not limited to any particular computer for performing the processing tasks of the invention. The term "computer," as that term is used herein, is intended to denote any machine capable of performing the calculations, or computations, necessary to perform the tasks of the invention. The term "computer" is intended to denote any machine that is capable of accepting a structured input and of processing the input in accordance with prescribed rules to produce an output. It should also be noted that the phrase "configured to" as used herein means that the computer is equipped with a combination of hardware and software for performing the tasks of the invention, as will be understood by those skilled in the art.

Computer 120 is further configured for calculating the out of roundness index O resulting from the stresses and for comparing the out of roundness index O with at least one distortion limit D to determine whether the turbine case has a satisfactory or an unsatisfactory out of roundness index O. In addition computer 120 is configured for controlling the temperature distribution until the out of roundness index O satisfies distortion limit D.

An exemplary thermal measurement system includes a number of temperature sensors 30 positioned on turbine case 10, as shown for example in FIG. 2. As discussed above with respect to the method embodiment, exemplary temperature sensor locations 90 near tip clearance measurement probes (not shown) are positioned around a row of airfoils 73 on the outer case circumference, as shown for example in FIG. 3.

Another exemplary measurement system includes an infrared radiometer 110, as schematically indicated in FIG. 10 for obtaining infrared images under a variety of operating conditions, such as during start-up, steady-state, restart and shut-down operations. FIG. 1 shows gas turbine engine 60 as viewed from an exemplary infrared radiometer. An exemplary infrared radiometer is an infrared camera. The infrared images are calibrated, according to one embodiment, using thermal data obtained using the temperature sensors 30. The calibrated thermal images provide the temperature distribution for turbine case 10.

Computer 120 is configured to receive thermal data from measurement system 30, 110. For example, computer 120 is connected to temperature sensors 30 and infrared radiometer 110 by wires 112, 32, as shown for example in FIG. 10. Alternatively, the connection between computer 120 and measurement system 30, 110 can be wireless. For simplicity, only one wire 32 is shown in FIG. 10. However, each temperature sensor 30 is connected to computer 120 either directly or indirectly and by electrical or wireless means.

In order to efficiently process the large amount of thermal data generated by measurement system 30, 110, computer 120 is further configured to represent turbine case 10 as the collection of sections $S_i$. Advantageously, thermal measurement system 30, 110 is configured to obtain thermal data sets $\{T_{ijk}\}$ at one or more measurement times $t_j$, as discussed above with respect to the method embodiment. As those skilled in the art will understand, the thermal measurement system is configured to obtain the underlying thermal data, whereas computer 120 is configured to organize the thermal data into thermal data sets $\{T_{ijk}\}$. According to this embodiment, the out of roundness index O includes sectional out of roundness indices $\{O_{ij}\}$, which are discussed above.

To advantageously reduce the thermal data for use in the modeling step, according to another embodiment computer 120 is further configured for calculating coefficients of thermal variation $c_{ij}$, which are discussed above, for correlation with sectional out of roundness indices $\{O_{ij}\}$ to obtain the correlated sectional out of roundness indices $O_{ij}$ $(c_{ij})$. In addition, computer 120 is configured to compare the out of roundness index O with the distortion limit D on a section-by section basis. Namely, computer 120 is further configured for interpolating the correlated sectional out of roundness indices $O_{ij}$ $(c_{ij})$ to obtain the generalized coefficients of thermal variation $c_{ij}$ $(O_{ij})$, for evaluation thereof at the distortion limit D to determine the thermal variation limits $c_{ij}$ (D) that computer 120 then compares with coefficients of thermal variation $c_{ij}$ to determine whether the thermal data set $\{T_{ijk}\}$ satisfies the thermal variation limit $c_{ij}$ (D). Moreover, computer 120 is configured to control the temperature distribution by altering the temperature distribution to satisfy thermal variation limits $c_{ij}$ (D) in each section $S_i$.

According to a more specific embodiment, computer 120 is configured to alter the temperature distribution by modeling a new temperature distribution comprising new thermal data sets $\{T_{ijk}'\}$ for turbine case 10 resulting from at least one hypothetical ij k design change to the turbine engine 60 or its environment. Computer 120 also calculates a new coefficient of thermal variation $c_{ij}'$ using the new thermal data sets $\{T_{ijk}'\}$ that computer 120 compares with the thermal variation limits $c_{ij}$ (D) to determine whether the case of the redesigned turbine engine has a satisfactory or an unsatisfactory new temperature distribution. Moreover, computer 120 is configured to repeatedly alter the temperature distribution until the satisfactory new temperature distribution is obtained.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A method for controlling distortion of a turbine case, said method comprising:

measuring a temperature distribution for the turbine case, the temperature distribution comprising a plurality of thermal gradients;

modeling a plurality of thermal stresses on the turbine case induced by the thermal gradients;

calculating an out of roundness index resulting from the thermal stresses on the turbine case;

comparing the out of roundness index with at least one distortion limit; and controlling the temperature distribution until the out of roundness index satisfies the distortion limit.

2. The method of claim 1, wherein said measurement of the temperature distribution comprises measuring under a plurality of operating conditions.

3. The method of claim 1, wherein said measurement of the temperature distribution comprises using a plurality of temperature sensors positioned on the turbine case.

4. The method of claim 1, wherein said measurement of the temperature distribution comprises obtaining a plurality of infrared images of the turbine case.

5. The method of claim 4, wherein said measurement of the temperature distribution further includes:

using a plurality of temperature sensors positioned on the turbine case to obtain thermal data; and calibrating the infrared images using the thermal data.

6. The method of claim 1, wherein controlling the temperature distribution includes:

modeling a new temperature distribution for the turbine case resulting from at least one hypothetical design change, the new temperature distribution comprising a plurality of new thermal gradients;

modeling a plurality of new thermal stresses on the turbine case induced by the new thermal gradients;

calculating a new out of roundness index resulting from the new thermal stresses on the turbine case; and comparing the new out of roundness index with the distortion limit to determine whether the new out of roundness index satisfies the distortion limit, wherein the temperature distribution is repeatedly controlled until the new out of roundness index satisfies the distortion limit.

7. The method of claim 1, wherein said calculation of the out of roundness index comprises:

determining a plurality of radii for the turbine case under the thermal stresses, the radii being determined for a plurality of angular orientations around the turbine case;

determining a mean radius for the turbine case under the thermal stresses; and averaging a difference between the radii and the mean radius over the angular orientations around the turbine case to obtain the out of roundness index.

8. The method of claim 1, further comprising:

representing the turbine case as a plurality of sections, wherein said measurement of the temperature distribution includes obtaining a plurality of thermal data sets at one or more measurement times, each thermal data set being obtained for a respective one of the sections and for a respective measurement time, and wherein the out of roundness index comprises a plurality of sectional out of roundness indices, one sectional out of roundness index being provided for each of the sections for each measurement time.

9. The method of claim 8, wherein calculation of each sectional out of roundness index comprises:

determining a plurality of radii for a respective section of the turbine case at a respective measurement time, the radii being determined for a plurality of angular orientations around the section;

determining a mean radius for the section at the respective measurement time; and averaging a difference between the radii and the mean radius over the angular orientations around the section to obtain the sectional out of roundness index.

10. The method of claim 8, further comprising:

calculating a coefficient of thermal variation for each section at each measurement time using a respective thermal data set; and correlating each of the sectional out of roundness indices with the coefficient of thermal variation for the respective section and the respective measurement time to obtain a plurality of correlated sectional out of roundness indices, wherein said comparison of the out of roundness index with the distortion limit includes using the correlated sectional out of roundness indices.

11. The method of claim 10, wherein said comparison of the out of roundness index with the distortion limit includes:

interpolating each of the correlated sectional out of roundness indices to obtain a generalized coefficient of thermal variation for the respective section at the respective measurement time as a function of the sectional out of roundness index;

evaluating each of the generalized coefficients of thermal variation at the distortion limit to determine a thermal variation limit for the respective section and for the respective measurement time; and comparing each coefficient of thermal variation with the respective thermal variation limit to determine whether the respective thermal data set satisfies the thermal variation limit, and wherein said controlling of the temperature distribution includes altering the temperature distribution to satisfy the thermal variation limit in each of the sections.

12. The method of claim 11, wherein said alteration of the temperature distribution includes:

modeling a new temperature distribution for the turbine case resulting from at least one hypothetical design change, the new temperature distribution comprising a plurality of new thermal data sets, each new thermal data set being modeled for a respective one of the sections at a respective measurement time;

calculating a new coefficient of thermal variation for each section at each measurement time using a respective one of the new thermal data sets; and comparing each of the new coefficients of thermal variation with the respective thermal variation limit to determine whether a case of a redesigned turbine engine incorporating the hypothetical design change has a satisfactory or an unsatisfactory new temperature distribution, wherein the temperature distribution is repeatedly altered until the satisfactory new temperature distribution is obtained.

13. The method of claim 12, wherein the thermal stresses on the turbine case and the new temperature distribution are modeled using finite element analysis.

14. The method of claim 12, wherein said calculation of each of the coefficients of thermal variation includes:

determining a standard deviation $\sigma_{ij}$ of the respective thermal data set;

determining a mean temperature $\mu_{ij}$ for the respective thermal data set; and calculating the coefficient of thermal variation $c_{ij}$ as a function of the standard deviation $\sigma_{ij}$ and the mean temperature $\mu_{ij}$.

15. The method of claim 14, wherein said calculation of each of the new coefficients of thermal variation includes:

determining a standard deviation $\sigma_{ij}'$ of the respective new thermal data set;

determining a mean temperature $\mu_{ij}'$ for the respective new thermal data set; and calculating the new coefficient of thermal variation $c_{ij}'$ as a function of the standard deviation $\sigma_{ij}'$ and the mean temperature $\mu_{ij}'$.

16. The method of claim 15, wherein said calculation of the coefficient of thermal variation $c_{ij}$ is performed using a formula:

$$c_{ij}=\sigma_{ij}/\mu_{ij},$$

and wherein said calculation of the new coefficient of thermal variation $c_{ij}'$ is performed using a formula:

$$c_{ij}'=\sigma_{ij}/\mu_{ij}'.$$

17. The method of claim 12, further comprising:

implementing a design change to the turbine engine corresponding to the hypothetical design change providing the satisfactory new temperature distribution.

18. The method of claim 17, further comprising:

measuring a new actual temperature distribution; and confirming that the new actual temperature distribution satisfies the thermal distortion limit.

19. The method of claim 11, wherein said alteration of the temperature distribution includes:

modeling a new temperature distribution for the turbine case resulting from at least one hypothetical design change, the new temperature distribution comprising a plurality of new thermal data sets, each new thermal data set being modeled for a respective one of the sections at a respective measurement time;

calculating a new sectional out of roundness index for each new thermal data set;

calculating a new coefficient of thermal variation for each new thermal data set;

correlating each of the new sectional out of roundness indices with the new coefficient of thermal variation for the respective thermal data set to obtain a plurality of new correlated sectional out of roundness indices;

interpolating each of the new correlated sectional out of roundness indices to obtain a new generalized coefficient of thermal variation for the respective section at the respective measurement time as a function of the new sectional out of roundness index;

evaluating each of the new generalized coefficients of thermal variation at the distortion limit to determine a new thermal variation limit for the respective thermal data set; and comparing each of the new coefficients of thermal variation with the respective new thermal variation limit to determine whether a case of a redesigned turbine engine incorporating the hypothetical design change has a satisfactory or an unsatisfactory new temperature distribution, wherein the temperature distribution is repeatedly altered until the satisfactory new temperature distribution is obtained.

20. The method of claim 11, wherein the distortion limit comprises a plurality of distortion limits, one distortion limit being specified for each section, and wherein said evaluation of each of the generalized coefficients of thermal variation includes evaluating the generalized coefficient of thermal variation at a respective one of the distortion limits to determine the thermal variation limit for the respective section.

21. The method of claim 10, wherein said calculation of each of the coefficients of thermal variation includes:

determining a standard deviation $\sigma_{ij}$ of the respective thermal data set;

determining a mean temperature $\mu_{ij}$ for the respective thermal data set; and calculating the coefficient of thermal variation $c_{ij}$ as a function of the standard deviation $\sigma_{ij}$ and the mean temperature $\mu_{ij}$.

22. The method of claim 21, wherein said calculation of the coefficient of thermal variation $c_{ij}$ is performed using a formula:

$$c_{ij}=\sigma_{ij}/\mu_{ij}.$$

23. The method of claim 8, wherein obtaining the thermal data sets includes:

obtaining at least one infrared image of the turbine case;

obtaining calibration data using a plurality of temperature sensors, at least one temperature sensor being positioned on each section; and calibrating the infrared image using the calibration data to obtain the thermal data sets.

24. The method of claim 8, wherein each thermal data set comprises a plurality of thermal data obtained using at least two temperature sensors positioned on the respective section of the turbine case.

25. The method of claim 1, wherein the turbine case is a gas turbine case.

26. A system for controlling distortion of a turbine case, said system comprising:

a thermal measurement system for measuring a temperature distribution for the turbine case, the temperature distribution comprising a plurality of thermal gradients; and a computer configured for:

modeling a plurality of thermal stresses on the turbine case induced by the thermal gradients, calculating an out of roundness index resulting from the thermal stresses on the turbine case, comparing the out of roundness index with at least one distortion limit, and controlling the temperature distribution until the out of roundness index satisfies the distortion limit.

27. The system of claim 26, wherein said thermal measurement system comprises a plurality of temperature sensors positioned on the case.

28. The system of claim 27, wherein said thermal measurement system further comprises an infrared radiometer.

29. The system of claim 26, wherein said computer is further configured to represent the turbine case as a plurality of sections, wherein said thermal measurement system is configured to obtain a plurality of thermal data sets at one or more measurement times, each thermal data set being obtained for a respective one of the sections and for the respective measurement time, and wherein the out of roundness index comprises a plurality of sectional out of roundness indices, one sectional out of roundness index being provided for each of the sections for each measurement time.

30. The system of claim 29, wherein said computer is further configured for:

calculating a coefficient of thermal variation for each section at each measurement time using a respective thermal data set, and correlating each of the sectional out of roundness indices with the coefficient of thermal variation for the respective section and the respective measurement time to obtain a plurality of correlated sectional out of roundness indices, wherein said computer is configured to compare the out of roundness index with the distortion limit by:

interpolating each of the correlated sectional out of roundness indices to obtain a generalized coefficient of thermal variation for the respective section at the respective measurement time as a function of the sectional out of roundness index, evaluating each of the generalized coefficients of thermal variation at the distortion limit to determine a thermal variation limit for the respective section and for the respective measurement time, and comparing each coefficient of thermal variation with the respective thermal variation limit to determine whether the respective thermal data set satisfies the thermal variation limit, and wherein said computer is configured to control the temperature distribution by altering the temperature distribution to satisfy the thermal variation limit in each of the sections.

31. The system of claim 30, wherein said computer is configured to alter the temperature distribution by:

modeling a new temperature distribution for the case resulting from at least one hypothetical design change, the new temperature distribution comprising a plurality of new thermal data sets, each new thermal data set being modeled for a respective one of the sections at a respective measurement time, calculating a new coefficient of thermal variation for each section at each measurement time using a respective one of the new thermal data sets, and comparing each of the new coefficients of thermal variation with the respective thermal variation limit to determine whether a case of a redesigned turbine engine incorporating the hypothetical design change has a satisfactory or an unsatisfactory new temperature distribution, wherein said computer is configured to repeatedly alter the temperature distribution until the satisfactory new temperature distribution is obtained.

32. A method for controlling distortion of a gas turbine case, said method comprising:

representing the gas turbine case as a plurality of sections;

measuring a temperature distribution for the gas turbine case, the temperature distribution comprising a plurality of thermal data sets obtained at one or more measurement times, each thermal data set being obtained for a respective one of the sections and for the respective measurement time;

calculating a sectional out of roundness index for each of the thermal data sets;

comparing each sectional out of roundness index with a distortion limit; and controlling the temperature distribution until each of the sectional out of roundness indices satisfies the distortion limit.

33. The method of claim 32, further comprising:

calculating a coefficient of thermal variation for each section at each measurement time using a respective thermal data set;

correlating each of the sectional out of roundness indices with the coefficient of thermal variation for the respective thermal data set to obtain a plurality of correlated sectional out of roundness indices, wherein said comparison of the sectional out of roundness indices with the distortion limit includes:

interpolating each of the correlated sectional out of roundness indices to obtain a generalized coefficient of thermal variation for the respective thermal data set as a function of the sectional out of roundness index;

evaluating each of the generalized coefficients of thermal variation at the distortion limit to determine a thermal variation limit for the respective thermal data set; and comparing each coefficient of thermal variation with the respective thermal variation limit to determine whether the respective thermal data set satisfies the thermal variation limit, and wherein said controlling of the temperature distribution includes altering the temperature distribution to satisfy the thermal variation limit in each of the sections.

34. The method of claim 33, wherein said alteration of the temperature distribution includes:

modeling a new temperature distribution for the case resulting from at least one hypothetical design change, the new temperature distribution comprising a plurality of new thermal data sets, each new thermal data set being modeled for a respective one of the sections at a respective measurement time;

calculating a new coefficient of thermal variation for each of the new thermal data sets; and comparing each of the new coefficients of thermal variation with the respective thermal variation limit to determine whether a case of a redesigned gas turbine engine incorporating the hypothetical design change has a satisfactory or an unsatisfactory new temperature distribution, wherein the temperature distribution is repeatedly altered until the satisfactory new temperature distribution is obtained.

35. The method of claim 34, wherein said calculation of each of the coefficients of thermal variation includes:

determining a standard deviation $\sigma_{ij}$ of the respective thermal data set;

determining a mean temperature $\mu_{ij}$ for the respective thermal data set; and calculating the coefficient of thermal variation $c_{ij}$ using a formula $c_{ij}=\sigma_{ij}/\mu_{ij}$.

36. The method of claim 35, wherein said calculation of each of the new coefficients of thermal variation includes:

determining a standard deviation $\sigma_{ij}'$ of the respective new thermal data set;

determining a mean temperature $\mu_{ij}'$ for the respective new thermal data set; and calculating the new coefficient of thermal variation $c_{ij}'$ using a formula $c_{ij}'=\sigma_{ij}'/\mu_{ij}'$.

* * * * *